United States Patent [19]
Ideta

[11] Patent Number: 5,572,667
[45] Date of Patent: Nov. 5, 1996

[54] INTERRUPT PROCESSING DEVICE FOR CONTROLLING THE TIMING OF AN INTERRUPT SIGNAL INITIATED BY A DEBUGGING BREAK POINT IN AN INSTRUCTION CODE

[75] Inventor: Masako Ideta, Tokyo, Japan

[73] Assignee: NEC Corporation, Japan

[21] Appl. No.: 266,894

[22] Filed: Jul. 1, 1994

[30] Foreign Application Priority Data

Jul. 5, 1993 [JP] Japan .................................. 5-165548

[51] Int. Cl.$^6$ .............................. G06F 9/44; G06F 11/30
[52] U.S. Cl. .................................. 395/183.11; 395/733
[58] Field of Search .................................. 395/375, 733, 395/500, 800, 183.11, 700

[56] References Cited

U.S. PATENT DOCUMENTS

| | | | |
|---|---|---|---|
| 4,635,193 | 1/1987 | Moyer et al. | 395/375 |
| 4,742,452 | 5/1988 | Hirokawa | 395/325 |
| 4,866,665 | 9/1989 | Haswell-Smith | 395/575 |
| 4,998,197 | 3/1991 | Kurakazu et al. | 395/800 |
| 5,140,671 | 8/1992 | Hayes et al. | 395/76 |
| 5,148,379 | 9/1992 | Konno et al. | 364/578 |
| 5,193,156 | 3/1993 | Yoshida et al. | 395/375 |
| 5,371,746 | 12/1994 | Yamashita et al. | 395/183.14 |
| 5,390,305 | 2/1995 | Takahashi et al. | 395/375 |
| 5,455,936 | 10/1995 | Maemura | 395/183.11 |
| 5,491,793 | 2/1996 | Somasundaram et al. | 395/183.21 |
| 5,493,659 | 2/1996 | Kurakazu et al. | 395/375 |

Primary Examiner—Gopal C. Ray
Attorney, Agent, or Firm—Whitham, Curtis, Whitham & McGinn

[57] ABSTRACT

The present invention is an information processing device enabling to surely carry out interrupt processing by outputting an interrupt signal even if a breakpoint is set in or after the second byte of an instruction code. The information processing device of the present invention is configured such that when having received the break signal that is output at the time of detection of a breakpoint set in or after the second byte of the instruction code, the information processing device stores the event of input of the break signal, outputs the interrupt signal at the timing of completion of execution of the instruction code and generates an interrupt.

19 Claims, 10 Drawing Sheets

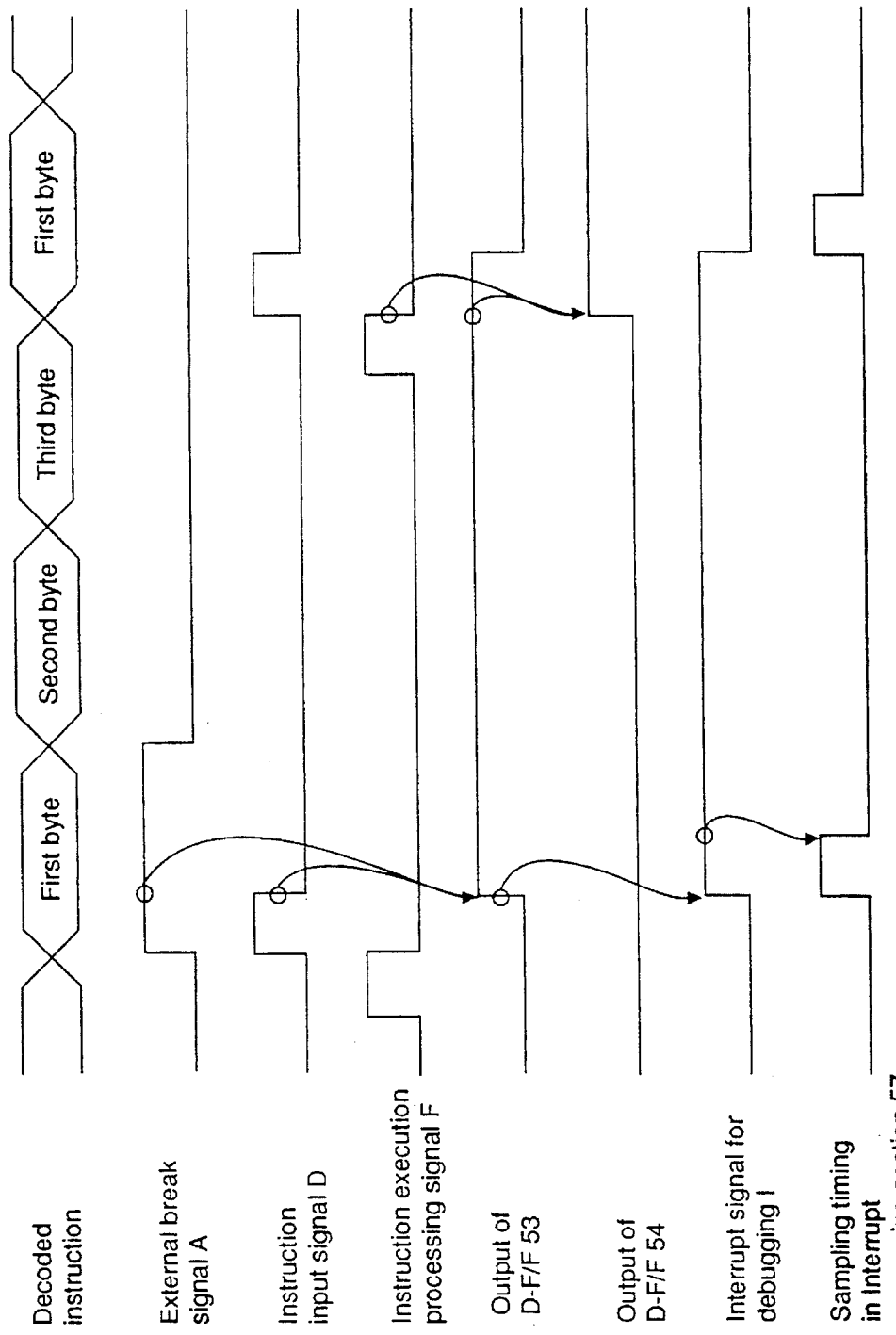

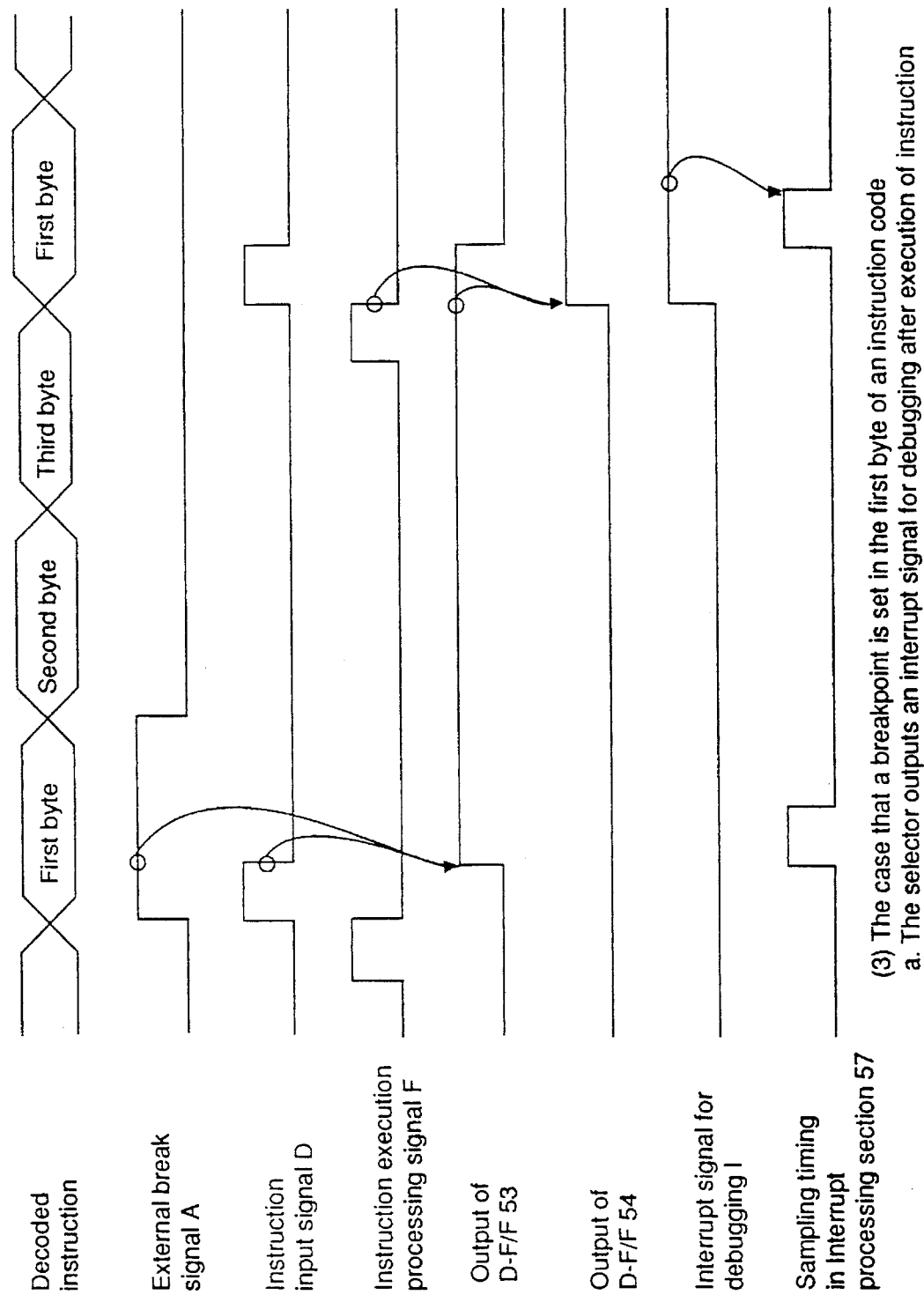

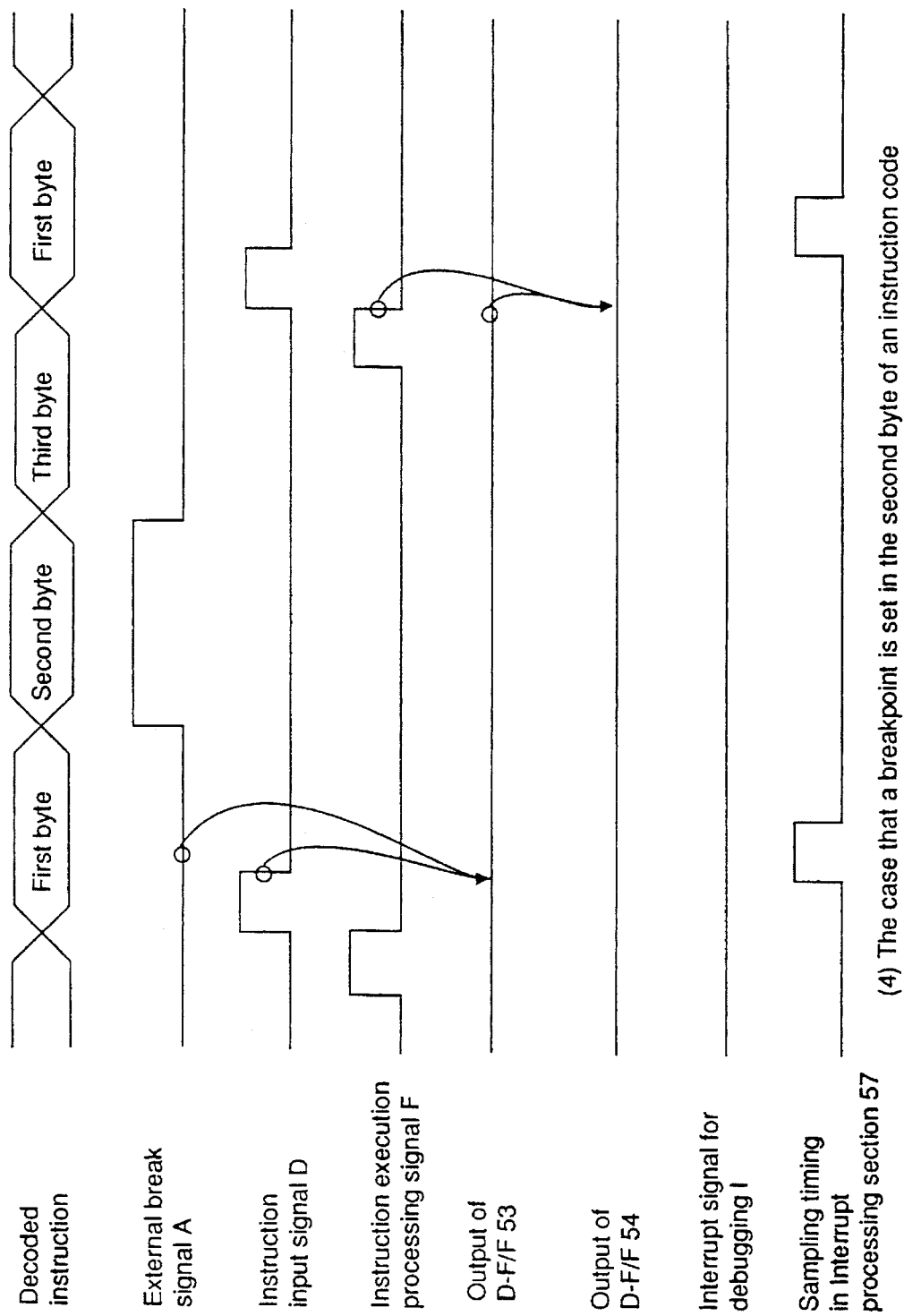

INTERRUPT PROCESSING DEVICE FOR CONTROLLING THE TIMING OF AN INTERRUPT SIGNAL INITIATED BY A DEBUGGING BREAK POINT IN AN INSTRUCTION CODE

BACKGROUND OF THE INVENTION

The present invention relates to an information processing device, especially an information processing device enabling to freely set a breakpoint.

Conventionally, there has been a method using a pipeline structure as one of means for improving performance of the information processing device.

The inside of this information processing device with the pipeline structure is divided into some functionally independent units that operate in parallel.

An explanation of the information processing device having such a pipeline structure is done in the lines that follow.

FIG. 5 is a block diagram of an information processing device 40 having the pipeline structure.

A bus control unit 41 in this figure is a unit exchanging data with external memories and peripheral devices of the information processing device 40.

A prefetch unit 42 is a unit for controlling to fetch instruction codes and for storing the fetched instructions into a buffer in the prefetch unit 42.

An instruction decoding unit 43 reads out the instructions stored in the buffer of the prefetch unit 42 in order and decodes them into a data format for an execution unit 44.

The execution unit 44 is a unit for executing the instructions in accordance with the decoded instructions.

For debugging a program with an in-circuit emulator, one of these information processing device, there is a method using breakpoints.

Next, the breakpoints are explained.

A user who intends to debug a user program sets in advance some addresses (breakpoints) that suspend program in the user program during execution of a monitor program of the in-circuit emulator.

Consecutively, during executing the user program, the breakpoint detection circuit detects an address that suspends execution of the user program and generates an interrupt before or after execution of an instruction that is set with the breakpoint.

Then, the control of the instruction is moved to the monitor program. The user can operate the monitor program to display the contents of a register or a memory to debug the user program.

As an art that realizes such a break in an information processing device having a pipeline structure, there is an art described in the Japanese Patent Laid-Open No.175539 (1993).

FIG. 6 is a block diagram showing a flow of a break operation of the above-mentioned art.

When the bus control unit 41 fetches an instruction from a data bus 46 and the address of the instruction to be executed and that of a breakpoint coincide, the breakpoint detection circuit 50 makes an external break signal A active. Information of the external break signal A is taken into the prefetch unit 42 with the fetched instruction B.

Then, the information of the external break signal A is brought to the execution unit 44 with the fetched information.

Next, movement of the information to the execution unit 44 from the instruction decoding unit 43 is explained using FIG. 7 showing a typical example.

A buffer 61 having information of a decoded instruction C and the external break signal A exists in the instruction decoding unit 43. The information is sent into both an instruction execution processing section 51 and an interrupt control section 52 in the execution unit 44.

Also, the instruction decoding unit 43 makes an instruction input signal D active when sending out the information of the decoded instruction C and the external break signal A to the execution unit 44. In addition, the instruction input signal D is also sent into the interrupt control section 52.

Consecutively, an internal operation of the execution unit 44 is explained in the following three cases.

(1) The case that a breakpoint is set in the first byte of an instruction code and a selector outputs an interrupt signal for debugging before execution of the instruction code.

When the first byte of the decoded instruction C in which the breakpoint is set has been input into the instruction execution processing section 51, the external break signal A that has been made active by the breakpoint detection circuit 50 is input into a delay-flip-flop 53 (delay-flip-flop is shortened as D-F/F in figures) in the interrupt control section 52.

Moreover, the instruction input signal D that informs the moment just before execution of the instruction code is output to the delay-flip-flop 53 by the instruction decoding unit 43.

Then, the interrupt signal for before-execution of instruction E that is an output signal of the delay-flip-flop 53 becomes active.

Next, When an instruction execution completion signal F that is output at the time of completion of an instruction execution taken by the instruction execution processing section 51 has been output, an interrupt signal for after-execution of instruction G that is an output of the delay-flip-flop 54 becomes active.

And, the outputs of the delay-flip-flops 53 and 54 are input into the selector 55 as an input X and an input Y, respectively.

Here, the selector 55 generates an interrupt signal I for debugging at the time of input of said interrupt signal for before-execution of instruction E, that is, the time before execution of the instruction, because the before-execution of an instruction (the input X of the selector 55) is selected as an output for interrupt for debugging by a selection signal H from the register 56.

The interrupt processing section 57 receives the interrupt signal for debugging I at a sampling timing, suspends the following instructions and moves execution onto the other address. An operation timing at this time is shown in FIG. 8.

(2) The case that a breakpoint is set in the first byte of an instruction code and a selector outputs an interrupt signal for debugging after execution of the instruction code.

The operation to the point that the outputs of the delay-flip-flops 53 and 54 are input into the selector 55 is the same as the case of the above-mentioned (1), so explanation is omitted.

The selector 55 generates the interrupt signal for debugging I at the time of input of said interrupt signal for after-execution of instruction G, that is, the time after execution of the instruction, because the after-execution of instruction (the input Y of the selector 55) is selected as an output for interrupt for debugging by the selection signal H from the register 56.

Then, similarly to the case (1), the interrupt processing section 57 receives an interrupt. The operation timing at this time is shown in FIG. 9.

(3) The case that a breakpoint is set in or after the second byte of an instruction code.

When the byte of the decoded instruction C in which the breakpoint is set has been input into the execution processing section 51, the external break signal A that has been made active by the breakpoint detection circuit 50 is input into the delay-flip-flop 53 in the interrupt control section 52.

At this time, the instruction input signal D is not output in or after the second byte of the decoded instruction C, because the instruction input signal D has been output in synchronized with the first byte of the decoded instruction C.

Therefore, when a breakpoint is set in or after the second byte of the decoded instruction C, the instruction input signal D is not output in synchronized with the external break signal A.

As a result, the interrupt signal for before-execution of instruction E is not output because the delay-flip-flop 53 neglects the external break signal A.

In addition, also the delay-flip-flop 54 uses the interrupt signal E for before-execution of instruction as an input, so it cannot output the interrupt signal for after-execution of instruction G.

Therefore, also the interrupt signal for debugging I is not output.

The operation timing at this time is shown in FIG. 10. (The case that a breakpoint is set in the second byte of the instruction code is shown).

Like this, in the case that a breakpoint is set in or after the second byte of an instruction code, an interrupt signal for debugging is not output and interrupt processing is neglected because the instruction input signal D is not output at the time of occurrence of the external break signal A.

For this reason, the prior art has a limitation that user must set a breakpoint at the user first byte of an instruction.

SUMMARY OF THE INVENTION

It is an object of the present invention that provides an information processing device enabling surely carrying out interrupt processing by outputting an interrupt signal even if a breakpoint is set in or after the second byte of an instruction code.

Moreover, the object of the present invention is to provide an information processing device enabling to increase efficiency of program development.

The object of the present invention is achieved by an information processing device for generating an interrupt using an interrupt signal when having received request for interrupt by a break signal corresponding to a fetched instruction code, comprising: a means for outputting an execution completion signal that informs completion of execution of the instruction code; and a means for outputting an interrupt signal that outputs the interrupt signal using the break signal and the execution completion signal, when having received the break signal that is output at the time of detection of a breakpoint set in or after the second byte of the instruction code.

In addition, in the information processing device of the present invention, when having received said break signal that is output at the time of detection of a breakpoint set in or after the second byte of said instruction code, said information processing device stores the event of input of said break signal, outputs said interrupt signal at the timing of completion of execution of said instruction code and generates said interrupt.

As a result, a desired interrupt processing is surely carried out, so it becomes possible to set a breakpoint in or after the second byte of an instruction code.

BRIEF DESCRIPTION OF THE DRAWINGS

FIG. 8 is a timing chart in the case that a breakpoint is set in the first byte of an instruction code and a selector is set so as to output an interrupt for debugging before execution of the instruction.

FIG. 9 is a timing chart in the case that a breakpoint is set in the first byte of an instruction code and a selector is set so as to output an interrupt for debugging after execution of the instruction.

FIG. 10 is a timing chart in the case that a breakpoint is set in or after the second byte of an instruction code and a selector is set so as to output an interrupt for debugging before execution of the instruction.

DETAILED DESCRIPTION OF THE INVENTION

Next, referring to figures the embodiments of the present invention are explained.

EMBODIMENT-1

Figure 1:
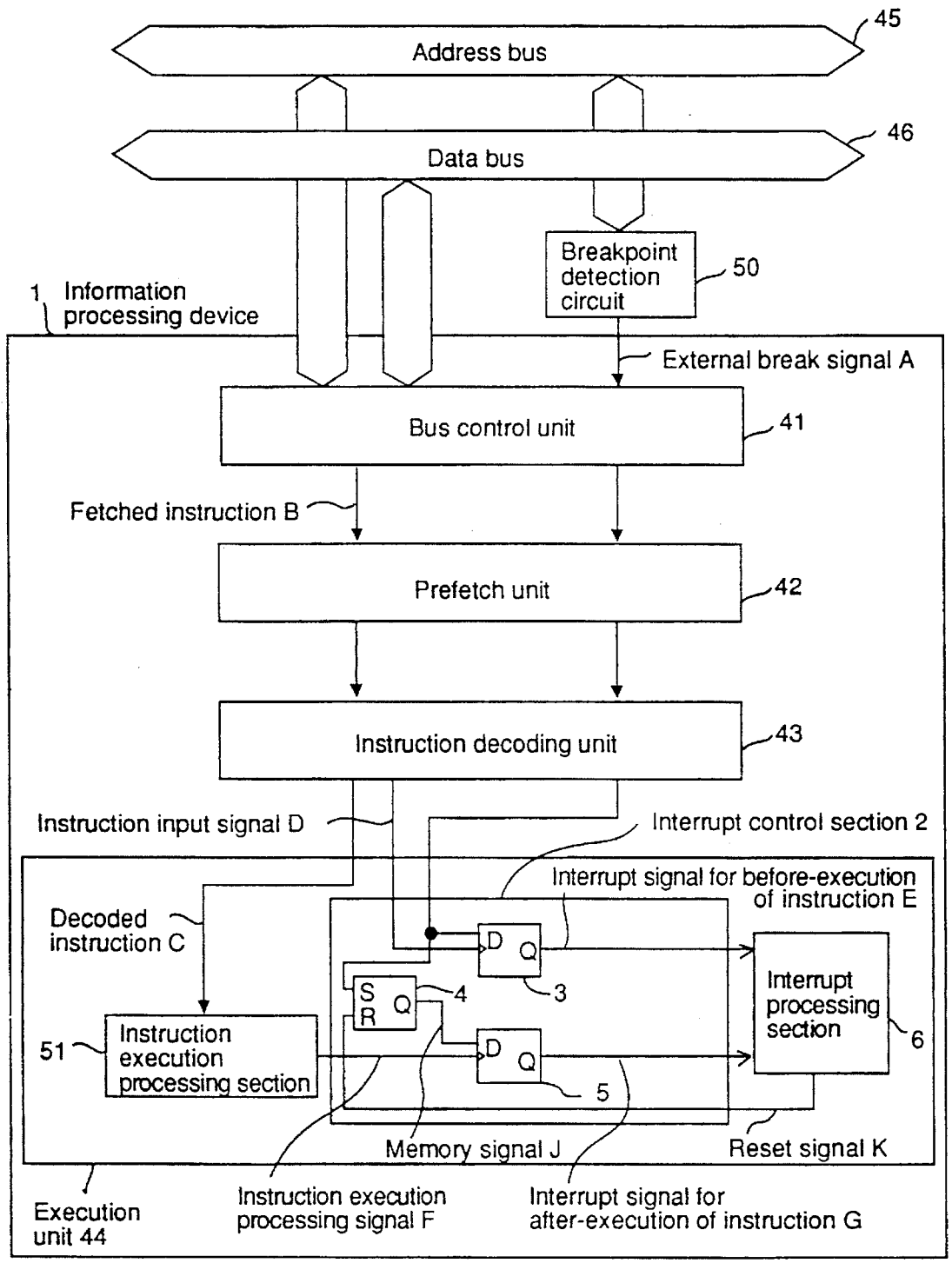
FIG. 1 is a block diagram of the first embodiment of the present invention.
Figure 6:
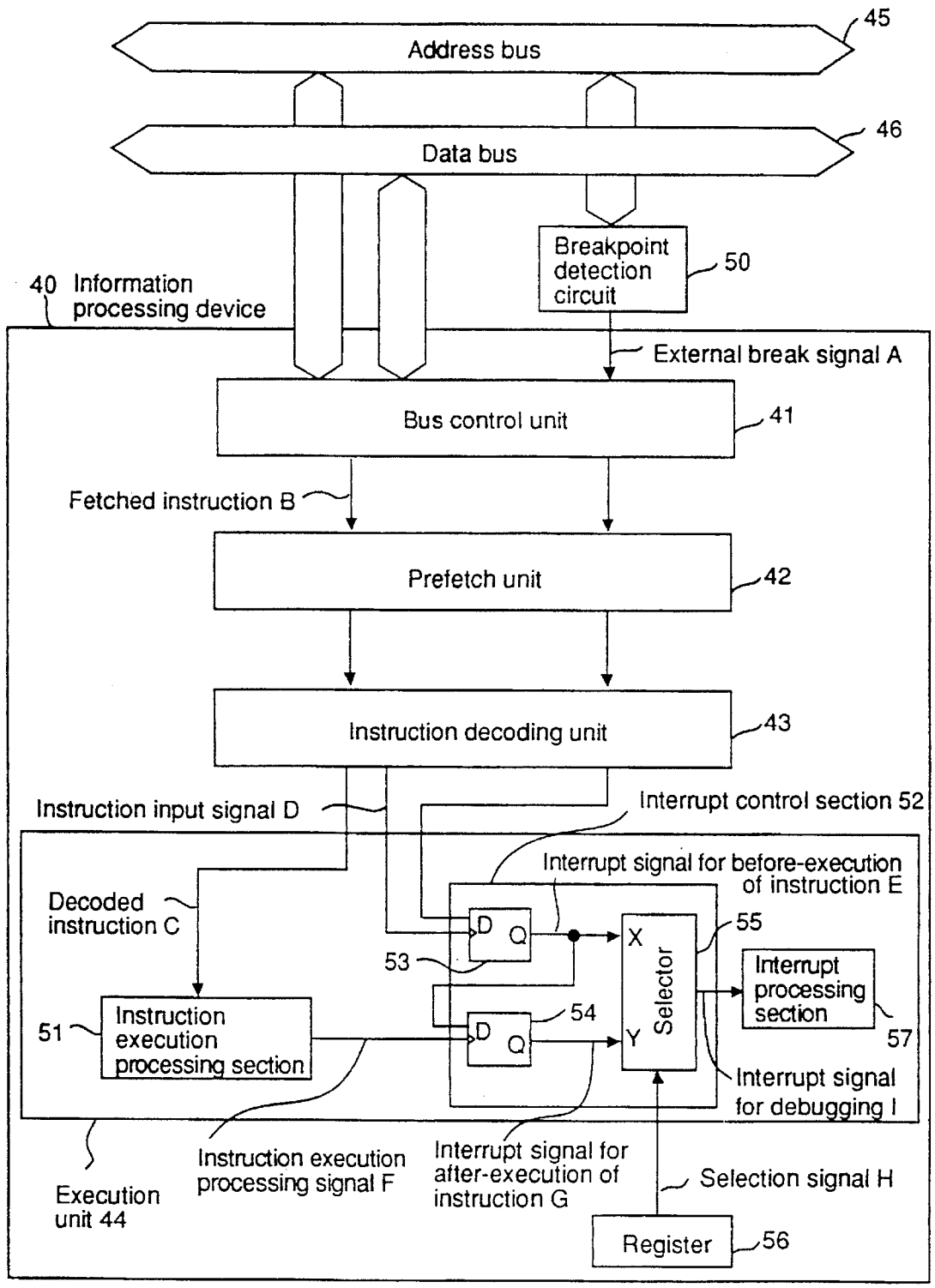
FIG. 6 is a block diagram showing details of an execution unit 44 in FIG. 5.
Figure 7:
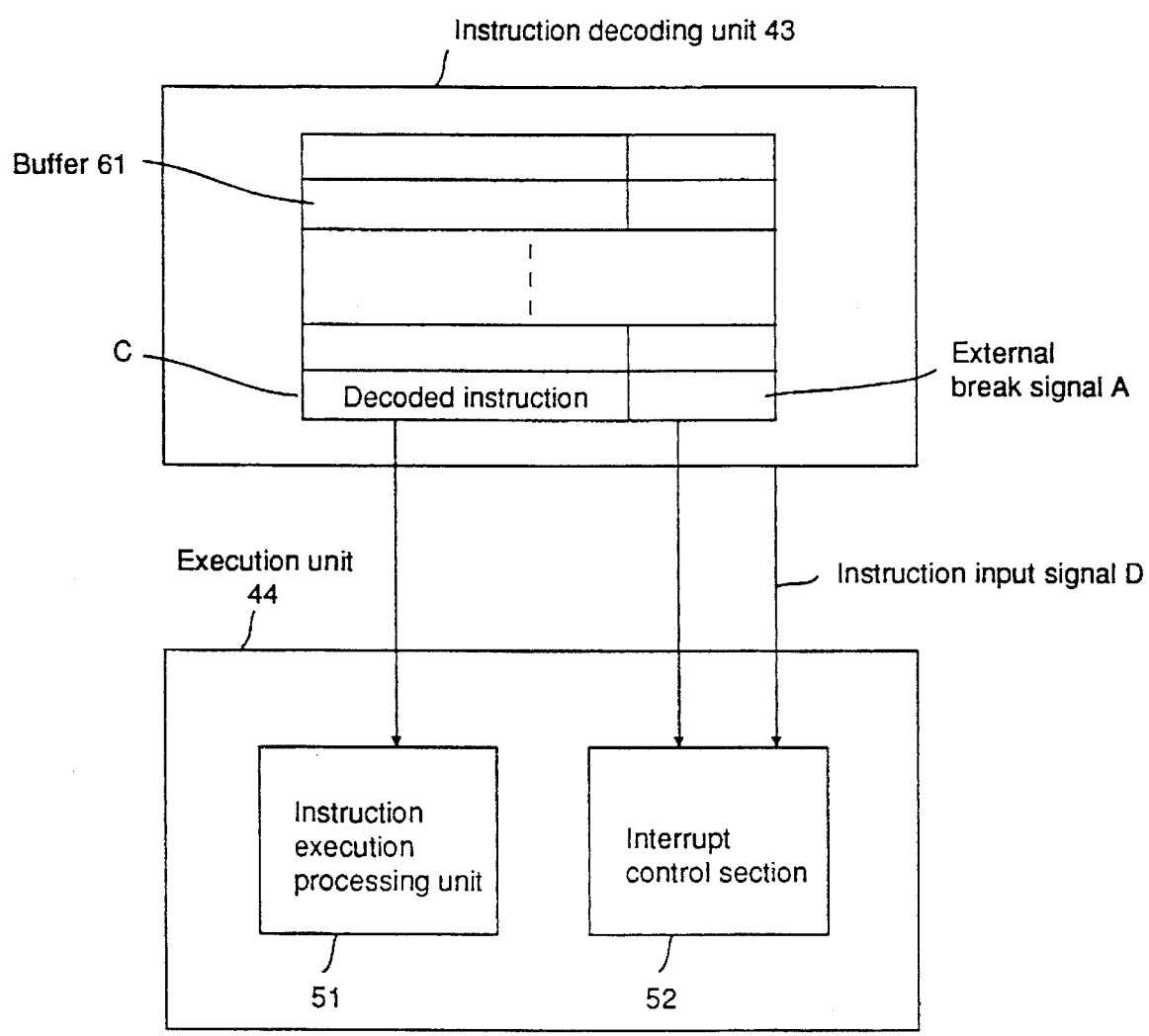
FIG. 7 is a figure showing data exchange between an instruction decoding unit 43 and the execution unit 44.

FIG. 1 is a block diagram of the first embodiment of the present invention. Where, a component in FIG. 1 having the same function as that in FIG. 6 is referred with the same number in FIG. 6, and the execution thereof is omitted.

1 is an information processing device of the present invention.

2 is an interrupt control section.

3 is the first delay-flip-flop. It latches the external break signal A as a data at input timing of the instruction signal D and makes an interrupt signal for before-execution of instruction E active.

4 is a set-reset-flip-flop (set-reset-flip-flop is shortened as RS-F/F in the figures). It inputs an external break signal A and stores the event of input of the external break signal A. Also it is outputting a memory signal J during storing the event. Here, the set-reset-flip-flop 4 is reset when a reset signal K output from an interrupt processing section 6 described later is input thereto 5 is the second delay-flip-flop. It latches the memory signal J output from the set-reset-flip-flop 4 as a data at input timing of the instruction execution processing signal F and makes an interrupt signal for after-execution of instruction G active.

The interrupt control section 2 comprises the delay-flip-flop 3, the set-reset-flip-flop 4 and the delay-flip-flop 5.

6 is an interrupt processing section. It inputs the interrupt signal for before-execution of instruction E and the interrupt signal for after-execution of instruction G and carries out interrupt processing. In addition, when having received the interrupt signal for before-execution of instruction E and the interrupt signal for after-execution of instruction G, this interrupt processing section outputs the reset signal K to the set-reset-flip-flop 4.

Next, the operation of the information processing device of the present invention is explained in the respective cases of (1) and (2).

(1) The case that a breakpoint is set in the first byte of an instruction code.

When the external break signal A is output from the instruction decoding unit 43, the delay flip-flop 3 latches the external break signal A as a data. Also, the set-reset-flip-flop 4 stores the event of input of the external break signal A and outputs the memory signal J.

At the time, the instruction input signal D is output from the instruction decoding unit 43, the delay flip-flop 3 makes the interrupt signal for before-execution of instruction E active at the timing (before execution of instruction) of input of the instruction input signal D.

Then, the interrupt signal for before-execution of instruction E is input into the interrupt processing section 6 and interrupt processing is carried out before execution of the instruction. The operation timing at this time is the same as that of FIG. 8.

It is to be noted that when the reset signal K output from the interrupt processing 6 is input into the set-reset-flip-flop 4, the set-reset-flip-flop 4 is reset and output of the memory signal J is stopped.

(2) The case that a breakpoint is set in or after the second byte.

When the external break signal A is output from the instruction decoding unit 43, the delay flip-flop 3 latches the external break signal A as a data. Also, the set-reset-flip-flop 4 stores the event of input of the external break signal A and outputs the memory signal J.

Where, the instruction input signal D has been output before the external break signal A is output, so the delay flip-flop 3 does not output the interrupt signal for before-execution of instruction E.

But, the memory signal J has been output from the set-reset-flip-flop 4, so the delay flip-flop 5 makes the interrupt signal for after-execution of instruction G active at the timing (after execution of the instruction) of input of the instruction execution processing signal F.

Figure 2:
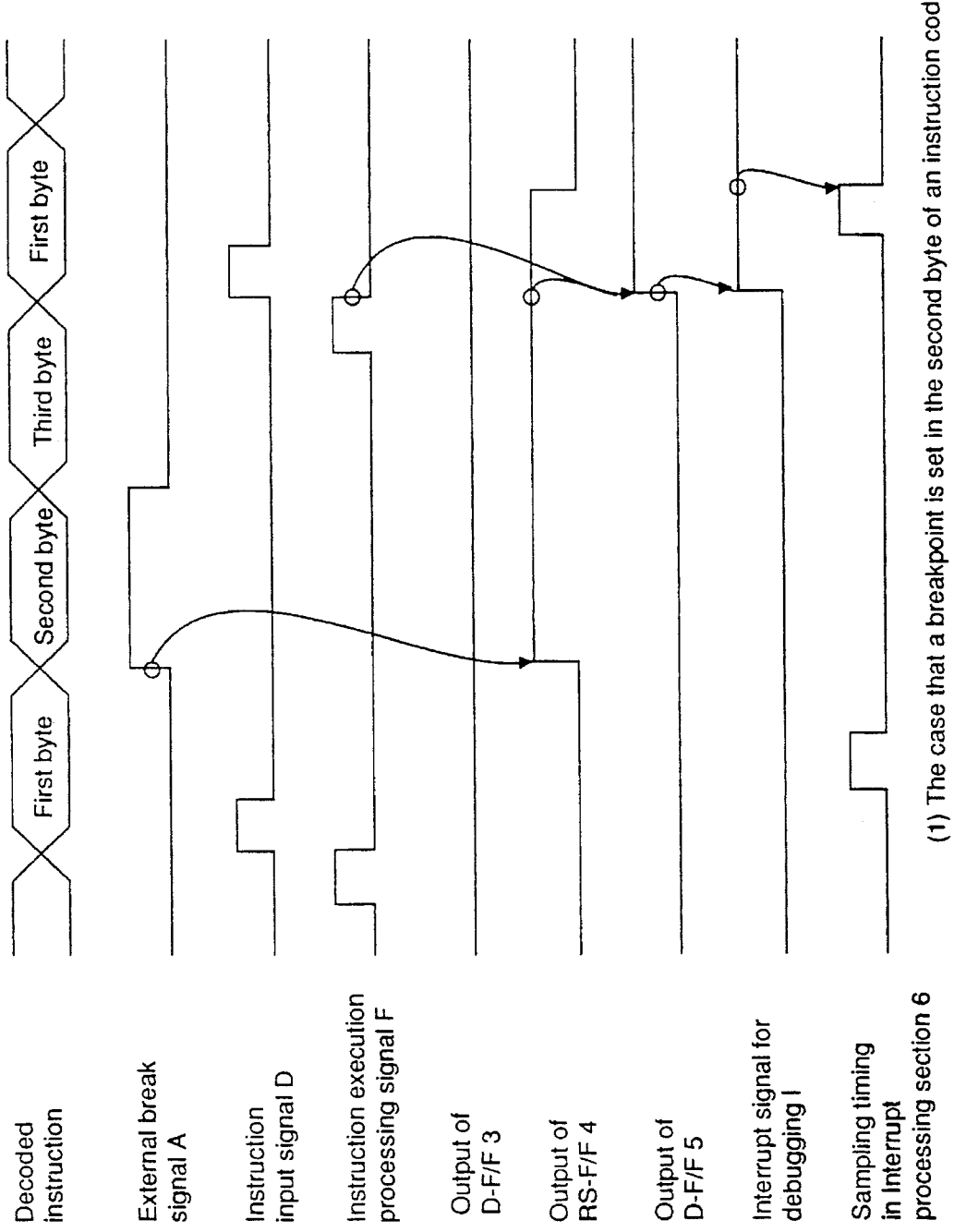
FIG. 2 is a timing chart of the first embodiment of the case that a breakpoint is set in the second byte of an instruction code.

Then, the interrupt signal for after-execution of instruction G is input into the interrupt processing section 6 and interrupt processing is carried out after execution of the instruction. The operation timing at this time is shown in FIG. 2.

EMBODIMENT-2

Next, the second embodiment of the present invention is explained.

Figure 3:
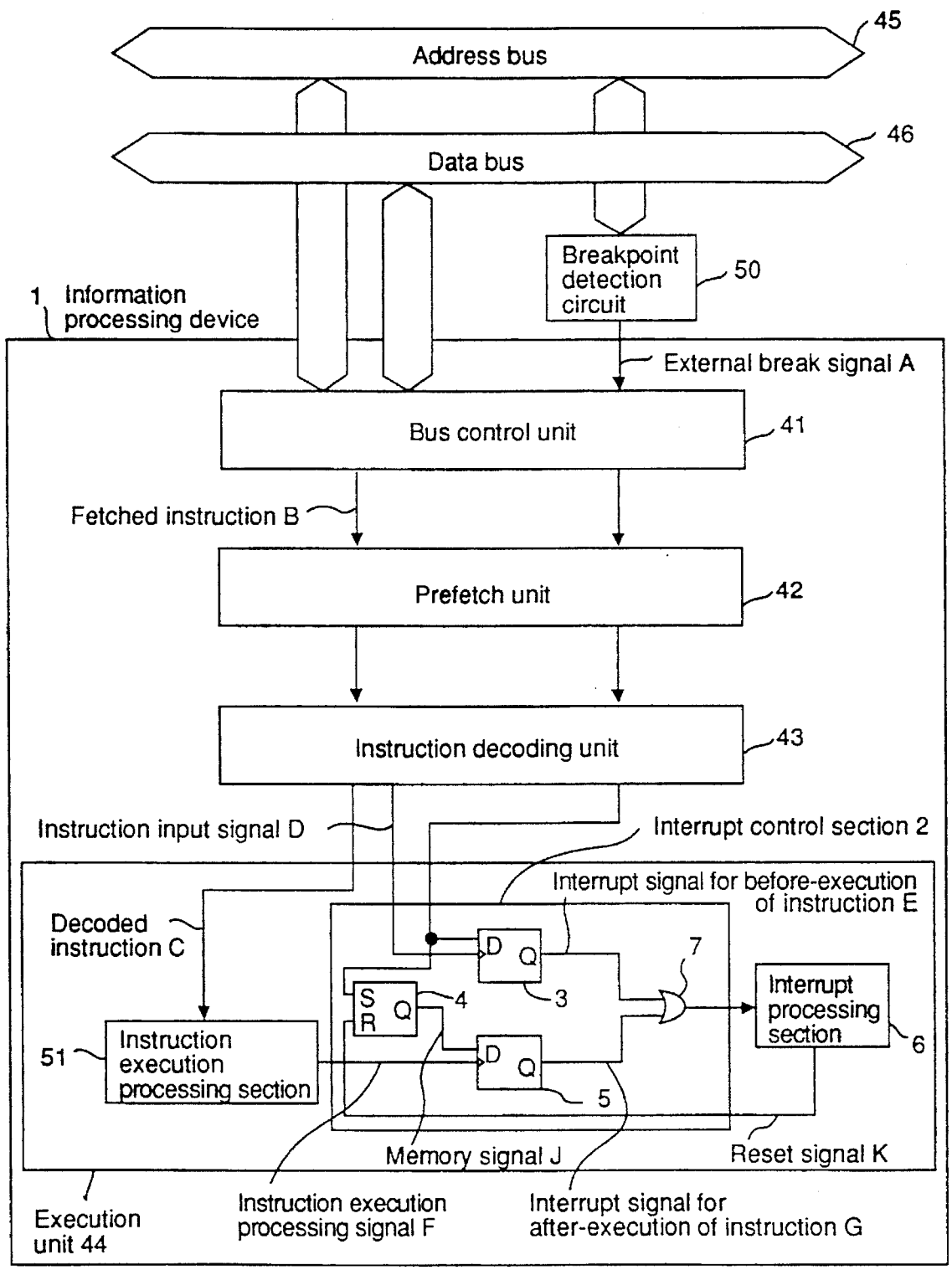
FIG. 3 is a block diagram of the second embodiment of the present invention.

FIG. 3 is a block diagram of the second embodiment of the present invention.

The second embodiment features that an OR circuit 7, which inputs the interrupt signal for before-execution of instruction E output from the first delay flip-flop 3 and the interrupt signal for after-execution of instruction G output from the second delay flip-flop 5 is provided.

This OR circuit 7 enables a single signal line to be connected to the interrupt processing section 6, so it is enough to prepare only one unit of register and so on for the interrupt processing section 6.

Therefore, the structure of the interrupt processing section 6 becomes simple.

EMBODIMENT-3

Next, the third embodiment of the present invention is explained.

Figure 4:
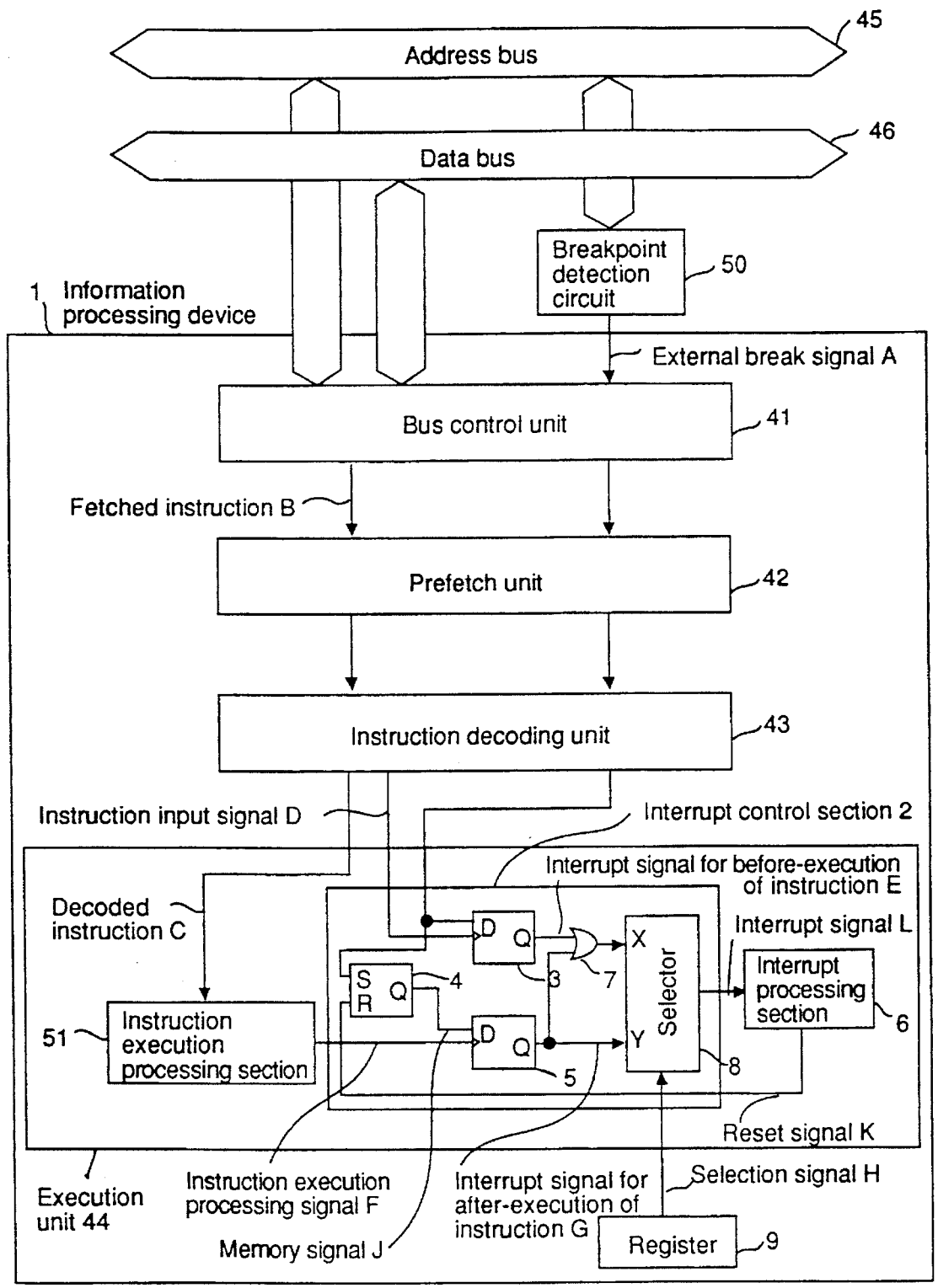
FIG. 4 is a block diagram of the third embodiment of the present invention.
Figure 5:
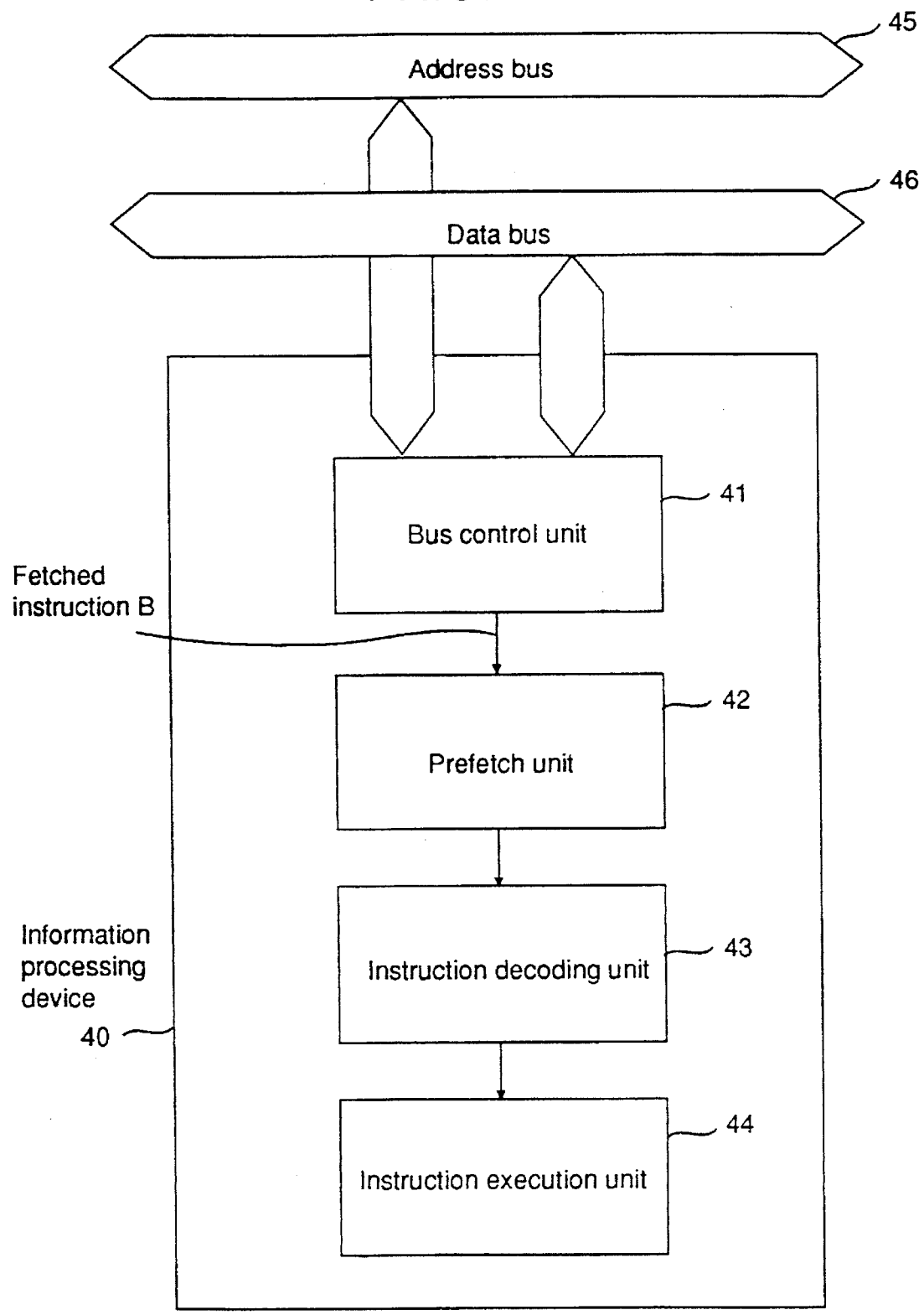
FIG. 5 is a block diagram of an information processing device having a prior pipeline structure.

FIG. 4 is a block diagram of the third embodiment.

The third embodiment comprises a selector 8 that enables to switch over an output of interrupt signal between before- or after-execution of instruction when a breakpoint is set in the first byte of an instruction code and a register 9 for outputting a switching instruction for the selector 8, in addition to the first embodiment.

Next, an operation of the third embodiment is explained.

(1) The case that a breakpoint is set in the first byte of an instruction code and a selector 8 outputs an interrupt signal before execution of the instruction.

When the external break signal A is output from the instruction decoding unit 43, the delay flip-flop 3 latches the external break signal A as a data. Also, the set-reset-flip-flop 4 stores the event of input of the external break signal A and outputs the memory signal J.

At the time, the instruction input signal D is output from the instruction decoding unit 43, the delay flip-flop 3 makes the interrupt signal for before-execution of instruction E active at the timing (before execution of the instruction) of input of the instruction input signal D.

Then, the interrupt signal for before-execution of instruction E is input to the input X of the selector 8 via the OR circuit 7.

Where, the selector 8 selects an interrupt signal of before-execution of instruction (the input X of the selector 8) according to a selection signal H output from the register 9, so an interrupt signal L is output at the time of input of said interrupt signal for before-execution of instruction E, that is, before execution of the instruction.

(2) The case that a breakpoint is set in the first byte of an instruction code and the selector 8 outputs an interrupt signal after execution of the instruction.

When the external break signal A is output from the instruction decoding unit 43, the delay flip-flop 3 latches the external break signal A as a data. Also, the set-reset-flip-flop 4 stores the event of input of the external break signal A and outputs the memory signal J.

At the same time, the instruction input signal D is output from the instruction decoding unit 43, the delay flip-flop 3 makes the interrupt signal for before-execution of instruction E active at the timing (before execution of the instruction) of input of the instruction input signal D.

Then, the interrupt signal for before-execution of instruction E is input into an input X of the selector 8 via the OR circuit 7.

But, the selector 8 is set so as to output the interrupt signal L after execution of the instruction, so the interrupt signal L can not be output by the interrupt signal for before-execution of instruction E.

On the other hand, the memory signal J has been output from the set-reset-flip-flop 4, so the delay flip-flop 5 makes the interrupt signal for after-execution of instruction G active at the timing (after execution of the instruction) of input of the instruction execution control signal F.

Then, the interrupt signal for after-execution of instruction G is input to an input Y in the selector 8 via the OR circuit 7. Where, the selector 8 is set so as to output the interrupt signal L after execution of the instruction, so the the interrupt signal L is output by the interrupt signal for after-execution of instruction G.

As a result, interrupt processing is carried out after execution of the instruction. The operation timing at this time is the same as that of FIG. 9.

As described above, the information processing device of the embodiment 3 enables to set an output timing of interrupt signal for debugging using a selector before or after execution of an instruction when a breakpoint is set in the first byte of an instruction code, in addition to the functions of the first embodiment.

It is to be noted that it is needless to say that operations and effects of the present invention is not affected if the break signal detection circuit 50 is provided within the information processing device, although it is provided within the information processing device in the embodiments 1, 2 and 3.

What is claimed is:

1. An information processing device for permitting generation of an interrupt signal requested by a break signal initiated by a breakpoint set in an instruction code, comprising:

means for outputting an execution completion signal indicating completion of execution of said instruction code; and means for generating an interrupt signal using said break signal and said execution completion signal when said breakpoint is set in or after a second byte of said instruction code.

2. The information processing device of claim 1, wherein said means for generating an interrupt signal comprises:

memory means for storing said break signal; and means for latching said break signal from said memory means and for outputting said interrupt signal at the occurrence of said execution completion signal.

3. The information processing device of claim 1, comprising:

means for outputting an execution start signal indicating a start of execution of said instruction code, wherein said means for generating an interrupt signal outputs said interrupt signal using said break signal and said execution start signal when having received said break signal that is output at the time of detection of a breakpoint set in a first byte of said instruction code.

4. The information processing device of claim 3, wherein said means for outputting an interrupt signal comprises:

a first flip-flop for receiving said break signal as a data and for outputting said interrupt signal after receiving said execution start signal;

a second flip-flop for receiving and storing said break signal as a data; and a third flip-flop for receiving an output signal from said second flip-flop and outputting said interrupt signal after receiving said execution completion signal.

5. The information processing device of claim 4, further comprising an OR-circuit for generating a new interrupt signal after receiving either an interrupt signal output from said first flip-flop or an interrupt signal output from said third flip-flop.

6. The information processing device of claim 4, comprising:

a selection circuit for selecting output timing of said interrupt signal from either a time before or after execution of said instruction code; and a register for outputting a switching instruction to said selection circuit, wherein said selection circuit outputs one of an interrupt signal output from said first flip-flop when the output timing of said interrupt signal is set in before-execution of said instruction code, and outputs an interrupt signal output from said third flip-flop when the output timing of said interrupt signal is set in after-execution of said instruction code.

7. The information processing device of claim 4, further comprising an interrupt processing section for executing an interrupt processing and for outputting a reset signal for resetting said second flip-flop, after receiving said interrupt signal.

8. The information processing device of claim 1, wherein said break signal is output from a breakpoint detection circuit provided outside of said information processing device, and said breakpoint detection circuit outputs said break signal after detecting an address where a breakpoint for stopping execution of said instruction code is set.

9. The information processing device of claim 1, wherein said break signal is output from a breakpoint detection circuit provided within said information processing device and said breakpoint detection circuit outputs said break signal after detecting said address where a breakpoint for stopping execution of said instruction code is set.

10. An information processing device for generating an interrupt signal when having received a request for an interrupt by a break signal corresponding to a fetched instruction code, comprising:

means for outputting an execution start signal indicating a start of execution of said instruction code;

means for outputting an execution completion signal indicating a completion of execution of said instruction code;

a first flip-flop for receiving said break signal as a data and for outputting said interrupt signal after receiving said execution start signal;

a second flip-flop for receiving and storing said break signal as dam; and a third flip-flop for receiving said data stored in said second flip-flop and for outputting said interrupt signal after receiving said execution completion signal.

11. The information processing device of claim 10, further comprising an OR-circuit for generating a new interrupt signal after receiving either an interrupt signal output from said first flip-flop or an interrupt signal output from said third flip-flop.

12. The information processing device of claim 10, further comprising:

a selection circuit for selecting output timing of said interrupt signal from either before or after execution of said instruction code; and a register for outputting a switching instruction to said selection circuit, wherein said selection circuit outputs an interrupt signal from one of said first flip-flop when the output timing of said interrupt signal is set in before-execution of said instruction code, and said third flip-flop when the output timing of said interrupt signal is set in after-execution of said instruction code.

13. A method for permitting the generation of an interrupt signal in an information processing device, comprising the steps of:

storing a break signal indicating an interrupt request in a memory, said break Signal being initiated by breakpoint set in an instruction code;

outputting an execution completion signal when execution of said instruction code is complete; and generating said interrupt signal with said break signal stored in said memory and said execution completion signal when said break signal is initiated by a breakpoint set in or after a second byte of said instruction code.

14. The method of claim 13, further comprising the steps of:

outputting an execution start signal for indicating a start of execution of said instruction code; and generating said interrupt signal with said break signal and said execution start signal when said breakpoint is set in a first byte of said instruction code.

15. An interrupt processing device for controlling the timing of an interrupt signal initiated by a debugging breakpoint placed in an instruction code, comprising:

means for generating an instruction code execution start signal;

means for generating an instruction code execution completion signal;

a first latch for receiving a break signal generated from said breakpoint, said first latch outputting a beforeexecution interrupt signal upon generation of said instruction code execution start signal;

a second latch for receiving said break signal generated from said breakpoint and holding a stored break signal upon generation of said instruction code execution completion signal;

a third latch for receiving said stored break signal and for outputting an after-execution interrupt signal; and interrupt selection means connected to outputs of said first and third latches, said interrupt selection means selecting said before-execution interrupt signal if said breakpoint is positioned in a first byte of said instruction code, and selecting said after-execution interrupt signal if said breakpoint is positioned in or after a second byte of said instruction code.

16. An interrupt processing device for controlling the timing of an interrupt signal initiated by a debugging breakpoint placed in an instruction code as recited in claim 15, further comprising an OR gate having inputs receiving said before-execution interrupt signal and said after-execution interrupt signal and having an output connecting to said interrupt selection means.

17. An interrupt processing device for controlling the timing of an interrupt signal initiated by a debugging breakpoint placed in an instruction code as recited in claim 16, further comprising:

a selector receiving as inputs said OR gate output and said after-execution interrupt signal and having an output connected to said interrupt selection means; and a register connected to said selector for storing data controlling the output of said selector.

18. An interrupt processing device for controlling the timing of an interrupt signal initiated by a debugging breakpoint placed in an instruction code as recited in claim 15 wherein said first latch comprises a D flip-flop, said second latch comprises an SR flip-flop, and said third latch comprises a D flip-flip.

19. An interrupt processing device for controlling the timing of an interrupt signal initiated by a debugging breakpoint placed in an instruction code as recited in claim 18 wherein said interrupt selection means outputs a reset signal for resetting said SR flip-flop.

* * * * *